(12) United States Patent
Chang et al.

(10) Patent No.: US 7,400,373 B2
(45) Date of Patent: Jul. 15, 2008

(54) LIQUID CRYSTAL DISPLAY PANEL AND METHOD MANUFACTURING THE SAME HAVING PARTICULAR SPACERS

(75) Inventors: Yung-Ho Chang, Tao-Yuan (TW); Ching-Chao Chang, Taipei (TW); Chien-Feng Chen, Taipei Hsien (TW)

(73) Assignee: HannStar Display Corp., Wugu Industrial Zone, Taipei County (TW)

( * ) Notice: Subject to any disclaimer, the term of this patent is extended or adjusted under 35 U.S.C. 154(b) by 452 days.

(21) Appl. No.: 10/908,820

(22) Filed: May 27, 2005

(65) Prior Publication Data

US 2006/0268214 A1  Nov. 30, 2006

(51) Int. Cl.
*G02F 1/1339* (2006.01)
*G02F 1/1333* (2006.01)
(52) U.S. Cl. ...................... 349/155; 349/158
(58) Field of Classification Search .............. 349/155, 349/158
See application file for complete search history.

(56) References Cited

U.S. PATENT DOCUMENTS

| 7,179,512 | B2 * | 2/2007 | Ebisu et al. ................ 428/1.5 |
| 2003/0020864 | A1 * | 1/2003 | Yanagawa et al. .......... 349/155 |
| 2003/0128309 | A1 | 7/2003 | Tsutomu |
| 2004/0239867 | A1 | 12/2004 | Yamashita et al. |
| 2006/0066801 | A1 * | 3/2006 | Liu et al. .................... 349/155 |

* cited by examiner

*Primary Examiner*—Mike Qi
(74) *Attorney, Agent, or Firm*—Winston Hsu

(57) ABSTRACT

A liquid crystal display (LCD) panel has a structure in which one of the thin film transistor (TFT) substrate and the color filter (CF) substrate has an indented pattern surface to contact or surround the end of the spacer, such that the friction between the spacers and indented pattern surface can be reduced, thus shifting of spacer to a wrong position can be avoided. A method of manufacturing such LCD panel is also disclosed.

27 Claims, 12 Drawing Sheets

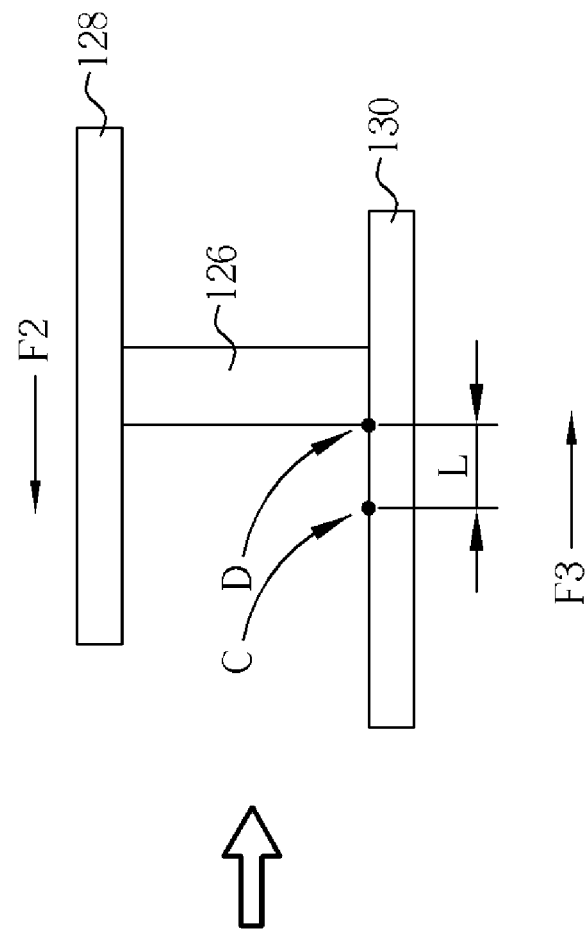
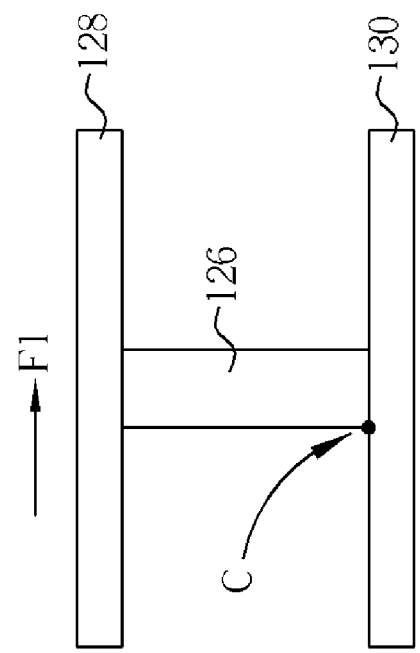
Fig. 3

LIQUID CRYSTAL DISPLAY PANEL AND METHOD MANUFACTURING THE SAME HAVING PARTICULAR SPACERS

BACKGROUND OF INVENTION

1. Field of the Invention

The present invention relates to a liquid crystal display (LCD) panel and a manufacturing method thereof, and more particularly, to a LCD panel having a novel structure to prevent spacers from shifting after the panel is pressed.

2. Description of the Prior Art

In general, LCD panels have characteristics, such as full color realization, low voltage operation, low power consumption, thinness, lightness in weight, and high image quality. Thus, they are widely used as monitors for electronic watches, calculators, notebook computers, personal computers and TV's, as well as monitors for aviation gauges, personal digital assistants (PDA's), and mobile stations.

FIGS. 1 and 2 show a structure of a conventional LCD panel. As shown in FIG. 1, the LCD panel includes a plurality of gate lines 102 and a plurality of data lines 104 formed to cross one another on a substrate 100, thereby defining a plurality of pixel regions. A plurality of common lines 106 are formed on the substrate 100. A pixel electrode 108 is formed at each pixel region. A plurality of thin film transistors (TFTs) 110 are formed at each corresponding crossing point of the gate line 102 and the data line 104 so as to apply signals of the data lines to each pixel electrode 108 according to signals of the gate lines. It is unnecessary for each pixel to have one spacer from the point of view of the total spacer density. However, if there is one spacer inside the specific pixel, place A is usually the place for spacers to reside on.

As shown in FIG. 2, the LCD panel further includes an insulation layer 112 for insulating the gate lines 102, the data lines 104, and the common lines 106, a passivation layer 114 for protection, an ITO layer 115 as a pixel electrode, and an alignment film 116 for aligning liquid crystal molecules, on the substrate 100. A color filter (CF) substrate 120 including a substrate 121, a black matrix layer 124, a color resin layer 123, an ITO layer 125, an alignment layer 127, and column spacers 122 is oppositely positioned. The column spacers 122 are formed on the CF substrate 120 and with the other end to reside on the TFT substrate so as to maintain a cell gap between the substrates 100 and 120. The liquid crystal (not shown) is filled between the two substrates.

With respect to such conventional LCD panel structure, the column spacers, also called photo spacers because they are made by photolithography, are formed and fixed on the CF substrate and they only make contact with the TFT substrate. When a wipe, push, or press is performed on the panel, a force is exerted on the panel. As shown in FIG. 3, the force may have a component F1 in the direction parallel to the surface of the panel. As a result, the spacer 126 moves together with the CF substrate 128 in a distance L from the original position C to a new position D on the TFT substrate 130. After the force is stopped exerting, it is desired that the spacer 126 moves back to the original position C. However, when a friction force F3 between the spacer 126 and the TFT substrate 130 is larger than the recovery force F2 for the CF substrate 128 and the spacer 126, the spacer 126 has a difficulty returning to the original position C; instead, it stay at the wrong position D.

When spacers stay at wrong positions, light leakage or crosstalk may occur. In order to eliminate such problem, the black matrix is enlarged in conventional techniques. However, as the black matrix is enlarged, the aperture ratio decreases; thus the properties of the LCD panel are deteriorated.

Therefore, there is still a need for a better LCD panel without the problem mentioned above.

SUMMARY OF INVENTION

An object of the present invention is to provide a LCD panel having a structure in which the spacer contacts or is surrounded by an indented pattern surface; thereby spacer position shifting after the panel is pressed or pushed is prevented.

In order to achieve the object mentioned hereinabove, the present invention provides a LCD panel. The LCD panel comprises a first substrate comprising thin film transistors; a second substrate; at least one spacer positioned between the first and second substrates, wherein an end surface of the spacer contacts or is surrounded by a region of the first or second substrate, and the region has a surface having a first indented pattern; and a liquid crystal material filling a space between the first and second substrates.

The present invention further provides a method of manufacturing a LCD panel, comprising the steps of: providing a first substrate; forming thin film transistors, common lines, gate lines, data lines, and an alignment film on the first substrate to give a thin film transistor substrate, wherein at least one predetermined region of the thin film transistor substrate is formed to have an first indented pattern surface; providing a second substrate; forming an electrode over the second substrate; forming at least one spacer on the second substrate at a position corresponding to the predetermined region of the thin film transistor substrate; adhering the thin film transistor substrate to the second substrate for forming a cavity, such that one end of each of the spacer contacts or is surrounded by the first indented pattern surface of the predetermined region; and filling the cavity with a liquid crystal material.

The present invention further provides a method of manufacturing a LCD panel, comprising the steps of: providing a first substrate; forming thin film transistors, storage capacitance lines, gate lines, data lines, and an alignment film on the first substrate to give a thin film transistor substrate, wherein a predetermined region of the thin film transistor substrate is formed to have an first indented pattern surface; providing a second substrate; forming an electrode over the second substrate; forming a plurality of spacers on the second substrate at a position corresponding to the predetermined region of the thin film transistor substrate; dropping a liquid crystal material on the thin film transistor substrate or the second substrate; and adhering the thin film transistor substrate to the second substrate, such that one end of each of the spacer contacts or is surrounded by the first indented pattern surface of the predetermined region.

Accordingly, the LCD panel according to the present invention has a structure in which the TFT substrate has an indented pattern surface to contact or surround the end of the spacer. The cavities or gaps of the indented pattern can hold the liquid crystal material, such that the friction between the spacers and indented pattern surface of the TFT substrate can be reduced. Therefore, shifting of spacer to a wrong position after the panel is pressed, pushed, or wiped can be avoided, and the light leakage or crosstalk will not happen.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 3 is a schematic diagram showing an error position for a spacer occurs in a conventional LCD panel.

DETAILED DESCRIPTION

The LCD panel according to the present invention comprises a pair of substrates, a plurality of spacers disposed between the substrates, and a liquid crystal material filling the space between the substrates. One of the substrates may include a plurality of TFTs, gate lines, data lines, and an alignment film. Another substrate may include a layer of color filter, and further a layer of black matrix. A common electrode or a pixel electrode may be further included on either of the substrates, depending on the display design.

Figure 1:
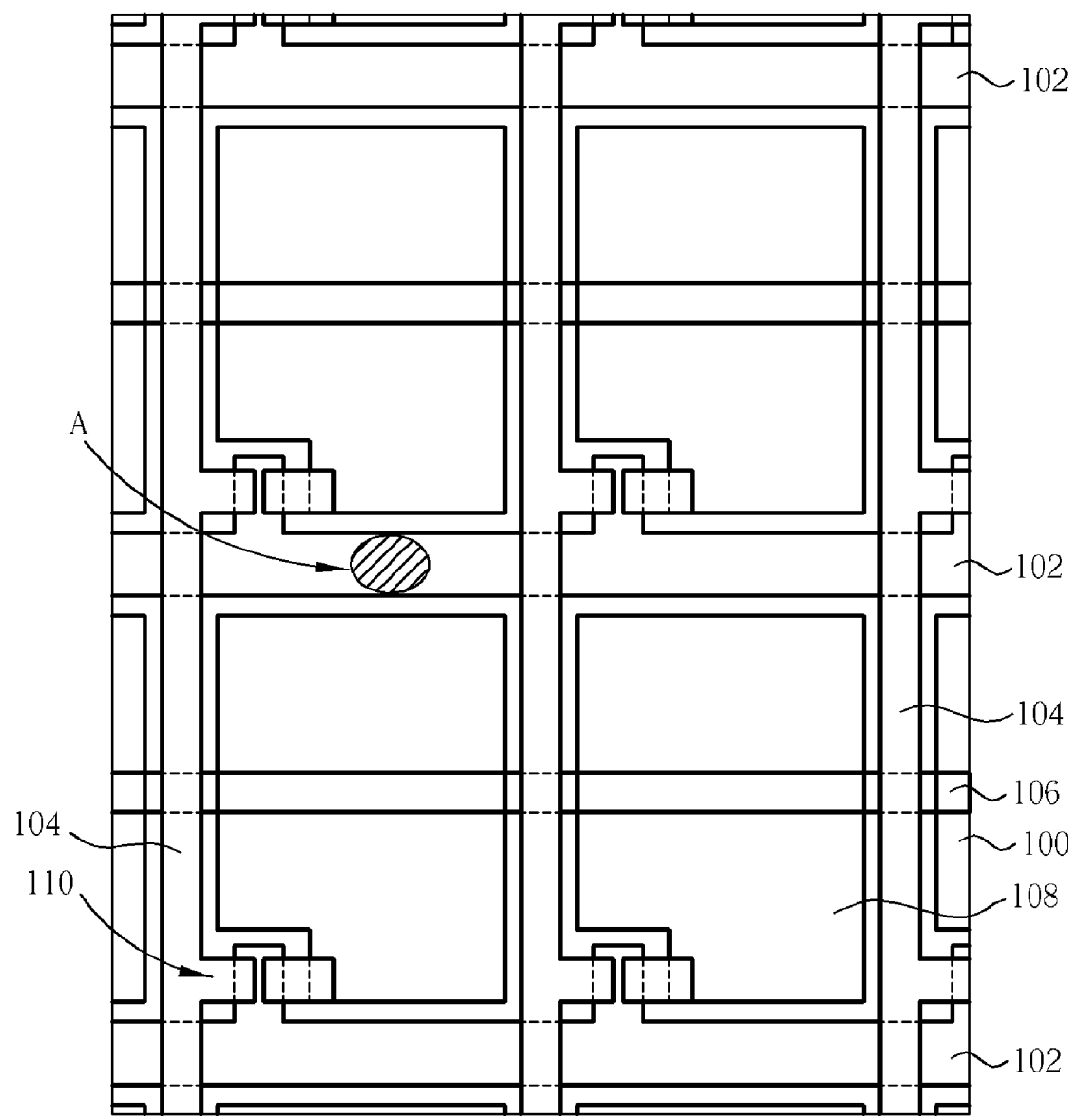
FIG. 1 is a schematic diagram showing a TFT substrate structure of a conventional LCD panel.
Figure 2:
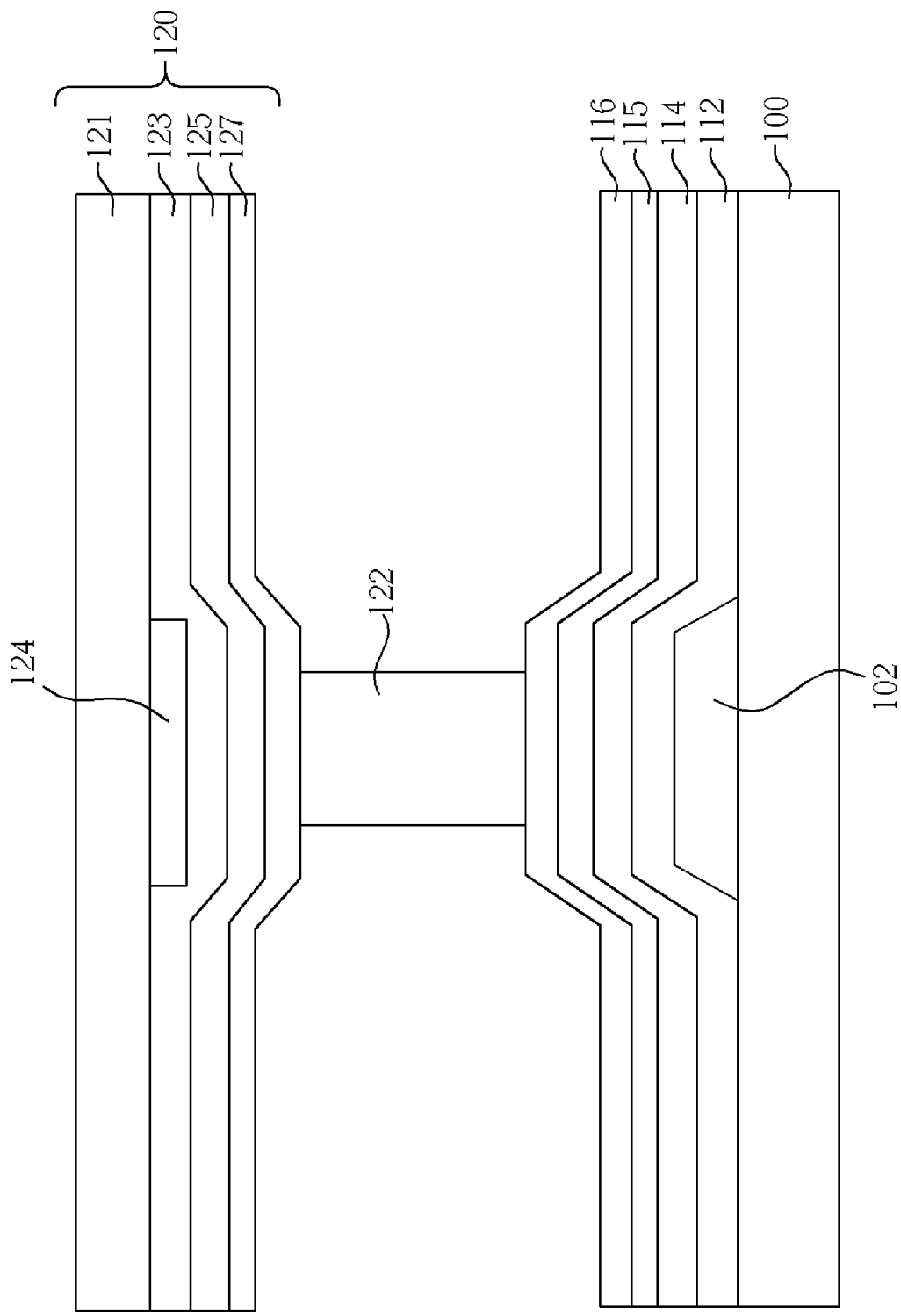
FIG. 2 is a schematic diagram showing a cross sectional view of a section of a conventional LCD panel.
Figure 4:
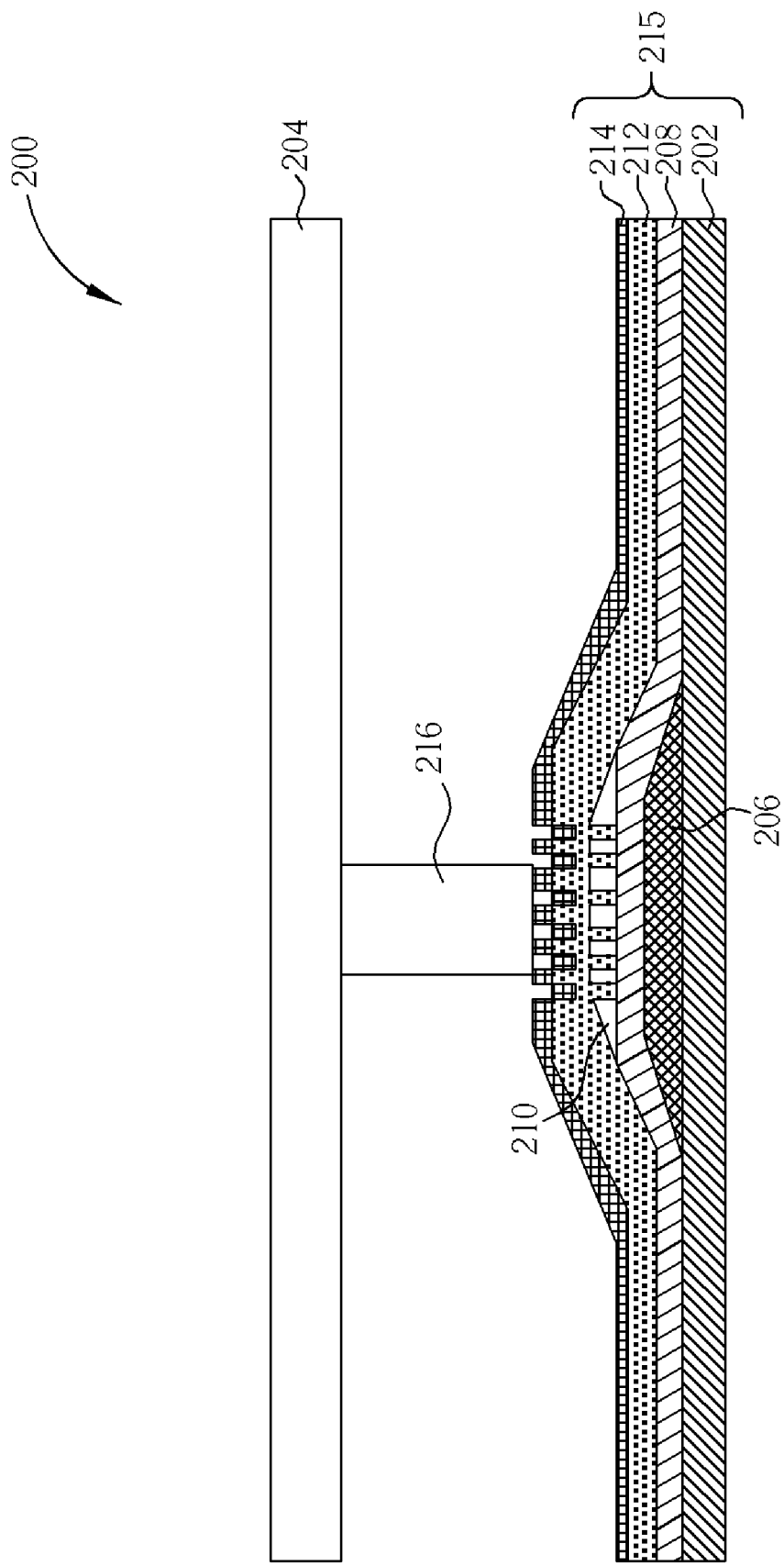
FIG. 4 is a schematic diagram showing a cross sectional view of a section of the LCD panel of an embodiment according to the present invention.

A plurality of spacers are arranged between the pair of the substrates. A liquid crystal material is disposed in the space between the pair of substrates. Please refer to FIG. 4. FIG. 4 is a schematic diagram showing a cross sectional view of a section of the LCD panel of an embodiment according to the present invention. The LCD panel 200 comprises a substrate 202. A metal layer 206 as a gate line is on the substrate 202. An insulation layer 208 is on the metal layer 206 and the substrate 202 for insulating TFTs, gate lines, and data lines. A layer of material 210 is on the surface of the insulation layer 208 at the position corresponding to the metal layer 206. The layer of material 210 is formed with an indented pattern and has an area larger than the end area of the spacer intended to be disposed at the corresponding position. A passivation layer 212 is over the layer of material 210 and data lines. Due to the indented pattern of the layer of material 210, the region of the passivation layer 212 thereon also has an according indented pattern in a corresponding shape at the corresponding position. Then, an alignment film 214 is formed on the passivation layer 212, and accordingly, the resulting alignment film 214 also has an indented pattern in a corresponding shape at the corresponding position of the indented pattern of the passivation layer 212. Thus, the surface of the resulting TFT substrate 215 has an indented pattern surface, that is, a rough surface, at a predetermined region intended to contact or surround an end surface of the spacer. More than one type of indented pattern can be introduced into the TFT substrate.

The LCD panel 200 further includes a substrate 204. A layer of color filter (not shown) and a black matrix layer (not shown) may be further formed on the substrate 204. A spacer 216 is positioned between the substrate 204 and the TFT substrate 215. The spacer 216 may be a photo spacer and with a column shape formed via a photolithography process on the substrate 204 and therefore fixed to the substrate 204 at one end. Thus, the other end of the spacer is placed on the TFT substrate 215 at the predetermined region having the indented pattern surface via the assembly of the two substrates.

A liquid crystal material (not shown) is disposed to fill the space between the two substrates, including the space at the gaps or cavities of the indented pattern surface. The liquid crystal material filling process may be performed by a one drop fill (ODF) process or a vacuum injection method. Therefore, the LCD panel has a structure in which one substrate has a region with a surface having an indented pattern to contact or surround an end surface of the spacer.

It is noted that the layer of material 210 is additionally formed, as compared to a conventional LCD panel, and may comprise a material, such as metal, ITO, or other electrically conductive material, or a dielectric material, such as silicon based material like amorphous silicon ($\alpha$-Si), n+ silicon, silicon oxynitride, or polymers. In case that the layer of material 210 comprises the material as same as the data lines, the layer of material 210 may be formed simultaneously with the formation of the data lines (not shown in FIG. 4). In case that the layer of material 210 comprises the material as same as the thin film transistors, the layer of material 210 may be formed simultaneously with the formation of the thin film transistors (not shown in FIG. 4). Thus, it is not necessary to add a new process for forming the layer of material 210.

It is characterized that one substrate has a region with a surface having an indented pattern to contact or surround an end surface of the spacer, according to the present invention. Therefore, there are modifications for the present invention.

The indented pattern surface is not limited to be on the TFT substrate surface. The spacer may be formed and fixed on the TFT substrate, and the opposite substrate (such as, a CF substrate) may be formed to have a region with a surface having an indented pattern to contact or surround an end surface of the spacer.

The indented pattern surface is not limited to be formed with a particular layer or an additional layer as a base layer on the substrate. The indented pattern surface may be formed just on the alignment film, or on the layer beneath the alignment film, such as a passivation layer or an insulation layer, then, the layers successively formed above the indented layer will accordingly have a corresponding indented pattern after the deposition.

The indented pattern surface may be formed with an additional layer interposed between the layers on the TFT or CF substrate. For example, a layer of material may be additionally deposited on the insulation layer or on the passivation layer to have the indented pattern, and then the layers successively formed on the layer of material will accordingly have an indented pattern surface.

The predetermined regions for spacers to reside on may be at positions corresponding to the positions of the gate lines, data lines, or common lines. If the predetermined regions are at positions corresponding to the positions of the data lines, the layer of material is conveniently formed spontaneously with the formation of the gate lines or TFTs and with the same material as the gate lines or TFTs. If the predetermined regions are at positions corresponding to the positions of the common lines, the layer of material is conveniently formed spontaneously with the formation of the gate lines, data lines, or TFTs and with the same material as the gate lines, data lines, or TFTs.

The gaps or cavities of the indented pattern on the surface of the substrate are filled with liquid crystal materials, thus the friction between the spacer and the substrate is reduced. The gap or cavity preferably has a width of about 1 to 10 µm, as the spacer is usual in a shape of column having a diameter larger than 10 µm. When the gap or cavity is too wide, the spacer may be moved and stuck in the gap or cavity when the panel is pressed. The distance between two adjacent gaps or cavities is preferably about 1 to 10 μm.

Figure 5:
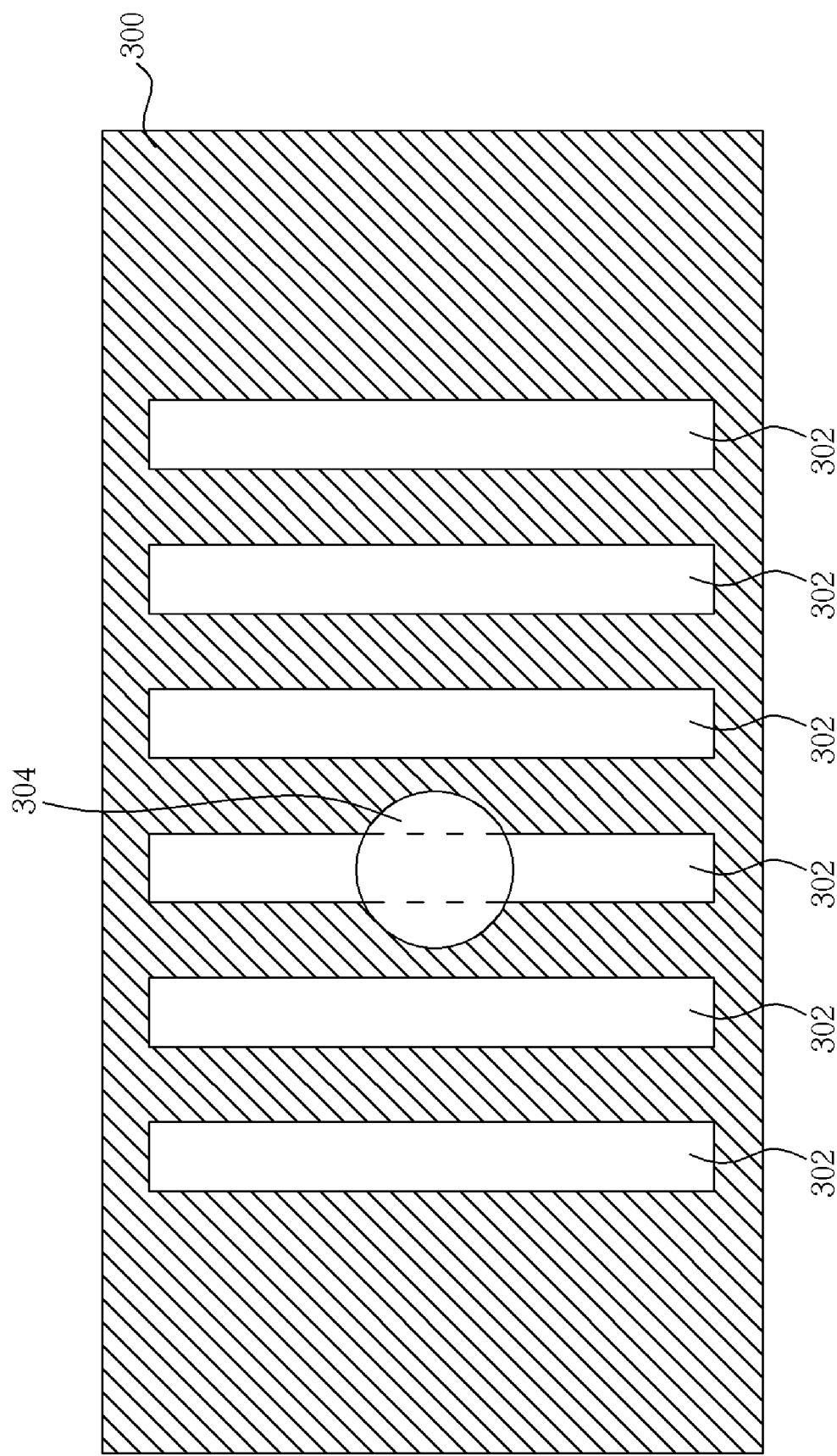
FIG. 5 is a schematic diagram showing an arrangement of the indented pattern surface and the spacer in the LCD panel according to the present invention.

The indented pattern according to the present invention may have various types. FIG. 5 shows one example from the top view of the gate line and many variations are possible. As shown in FIG. 5, an indented pattern is formed on the surface of the substrate 300 and includes a plurality of recess areas 302 in a bar shape. The spacer 304 is disposed on the substrate 300 to contact the indented pattern surface. The spacer may have a diameter of 12 μm. The width of the bar-shaped recess area 302 may be 4 μm, and the distance between two recess areas 302 may be 5 μm.

According to the present invention, it is characterized that the regions of the substrate for placing spacers have indented pattern surfaces and thus there are variations for the structures of the regions. The regions may have same or different structures in a LCD panel. FIGS. 6 to 12 show some embodiments according to the present invention.

Figure 6:
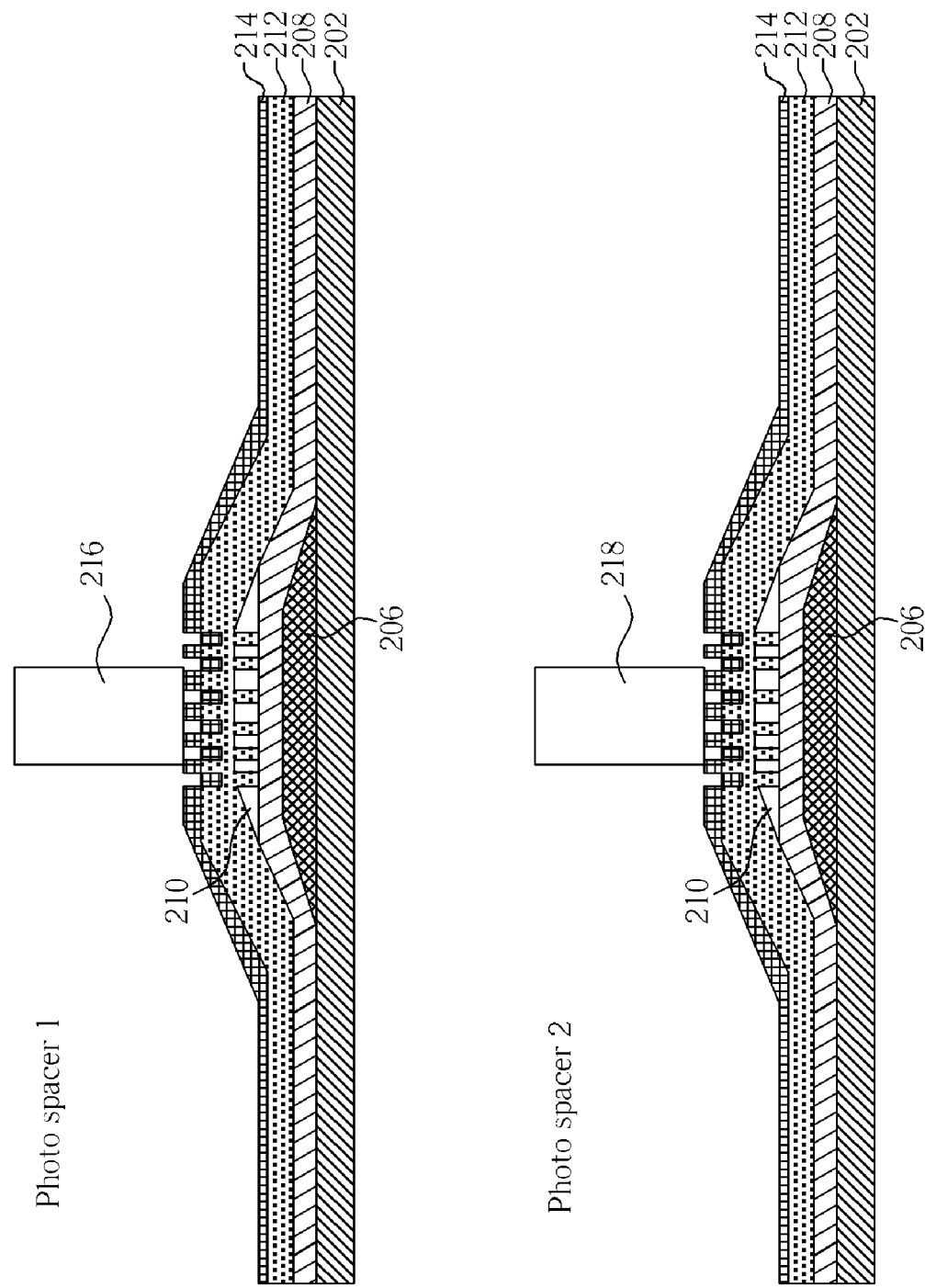
FIGS. 6-12 are each a schematic diagram showing a cross sectional view of two adjacent spacers on the substrate in a LCD panel with various modifications according to the present invention.

FIG. 6 is a schematic diagram showing a cross sectional view of two different types of spacers on the substrate in a LCD panel of the first embodiment according to the present invention. More than two different types of spacers are possible depending on the applications. Two spacers, photo spacer 1 and photo spacer 2, are positioned on a TFT substrate at regions corresponding to positions of gate lines at different pixels. For the region of the TFT substrate which the photo spacer 1 (216) is positioned on, the region comprises a substrate 202, a metal I layer 206 (the gate line) on the substrate 202, an insulation layer 208 on top of the metal I layer 206, a metal II layer 210 having an indented pattern on the insulation layer 208, a passivation layer 212 having an according indented pattern on the metal II layer 210, and an alignment film 214 having an according indented pattern on the passivation layer 212.

For the region of the TFT substrate which the photo spacer 2 (218) is positioned on, the region has the same structure as that of the photo spacer 216 is positioned on. The metal II layer 210 having an indented pattern is used as a base layer for forming the indented pattern surface on the TFT substrate.

The metal II layer 210 may be formed simultaneously with the formation of the data lines and with the same material as the data lines.

Figure 7:
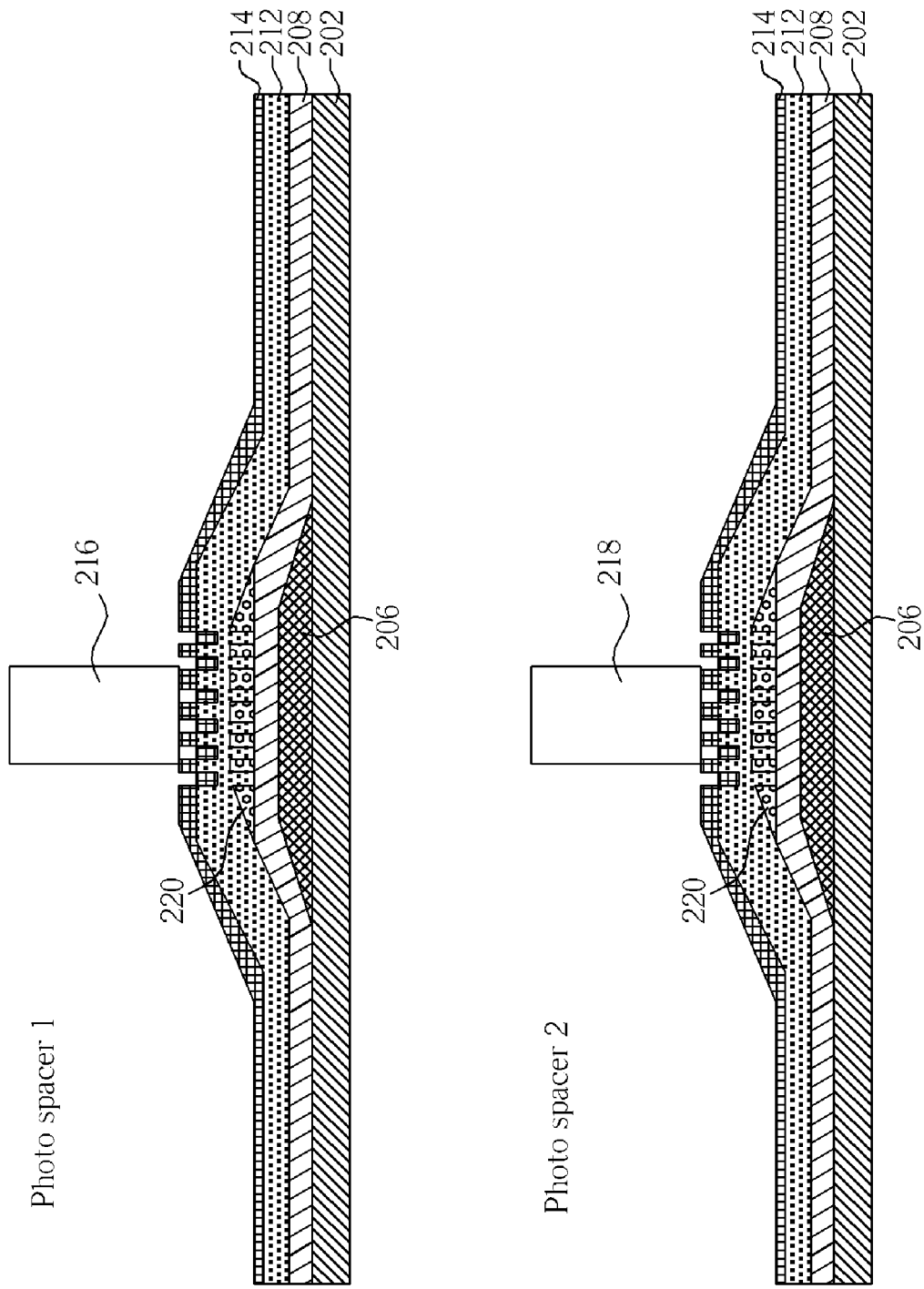

FIG. 7 shows the second embodiment according to the present invention. Two different types of spacers, photo spacer 1 and photo spacer 2, are positioned on a TFT substrate at regions corresponding to positions of gate lines at different pixels. The regions of the TFT substrate, which the photo spacers 1 (216) and the photo spacers 2 (218) are positioned on, have a similar structure to the structure of the region shown in FIG. 6, except that an α-Si layer 220 having an indented pattern surface, instead of the metal II layer 210, is on the insulation layer 208, to function as a base layer for forming the indented pattern surface on the TFT substrate.

The α-Si layer 220 may be formed simultaneously with the formation of the TFTs and with the same material as the TFTs.

Figure 8:
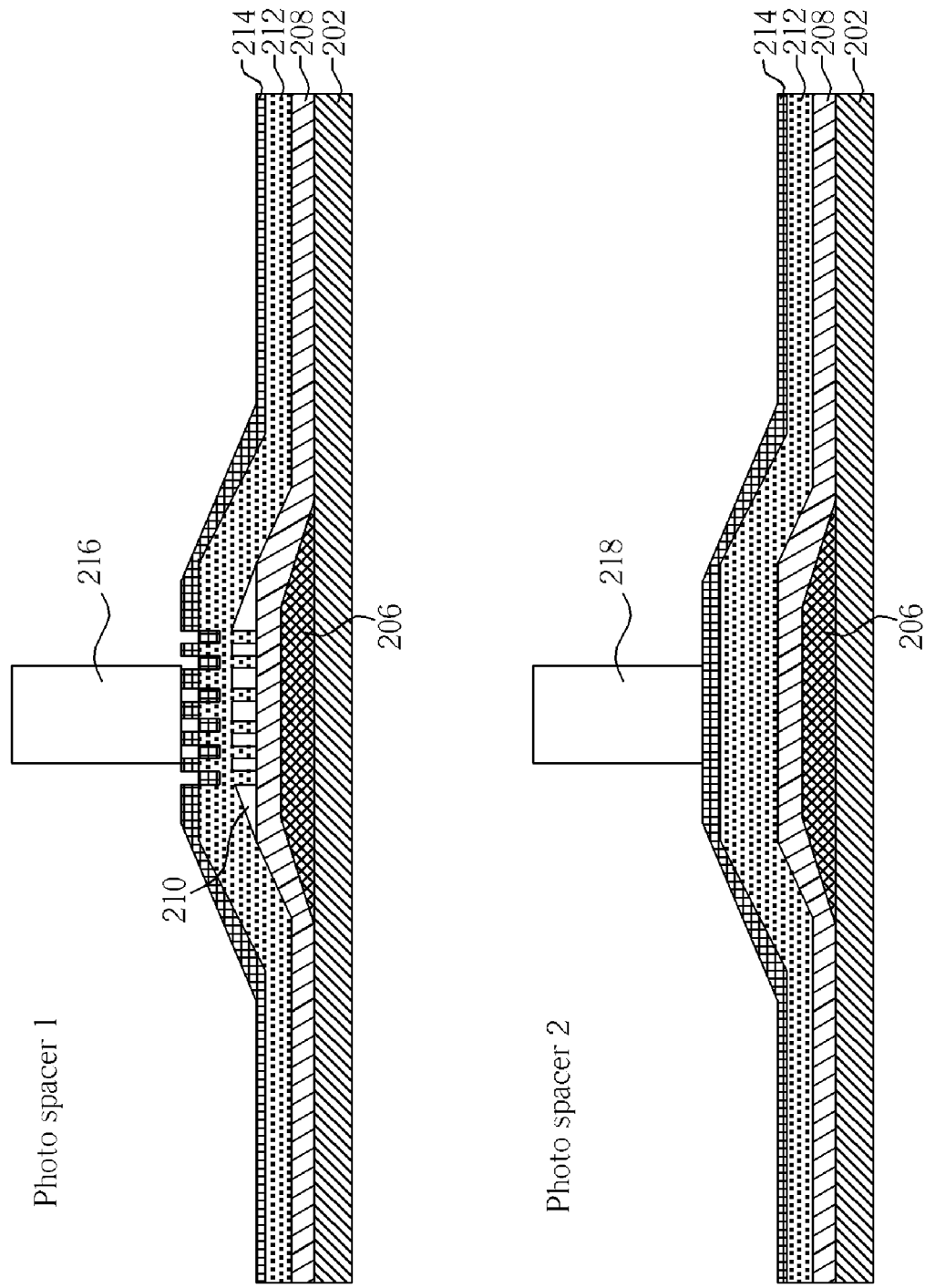

FIG. 8 shows the third embodiment according to the present invention. Two different types of spacers, photo spacer 1 and photo spacer 2, are positioned on a TFT substrate at regions corresponding to positions of gate lines at different pixels. The two regions have different structures. The region of the TFT substrate, which the photo spacer 1 (216) is positioned on, has a similar structure to the structure of the region shown in FIG. 6. The indented pattern surface is formed with the metal II layer having an indented pattern as a base layer. The region, which the photo spacer 2 (218) is positioned on, has not an indented pattern surface, that is, no indented pattern layers are formed, and the region has a structure as a conventional TFT substrate usually has.

Figure 9:
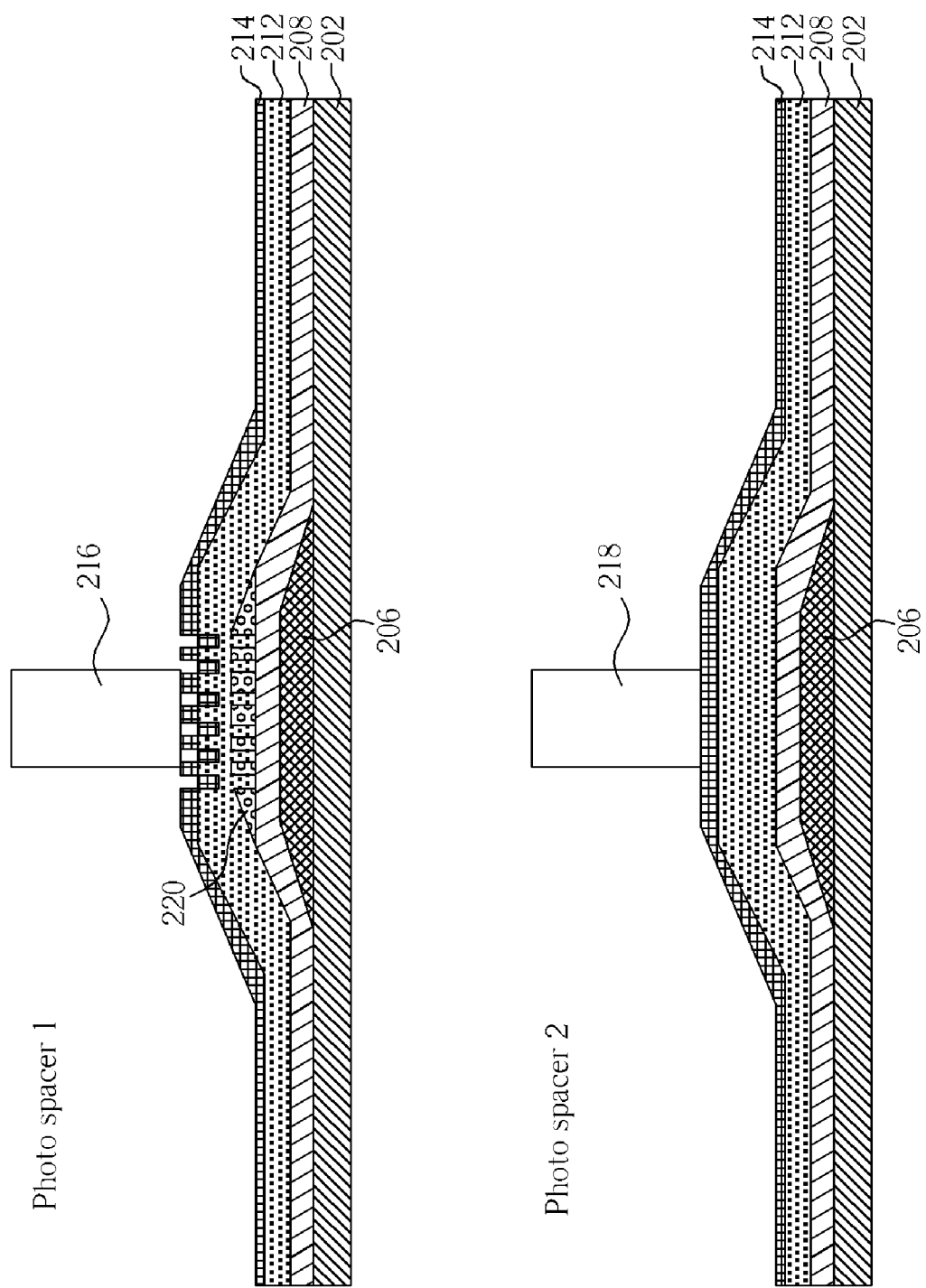

FIG. 9 shows the fourth embodiment according to the present invention. Two different types of spacers, photo spacer 1 and photo spacer 2, are positioned on a TFT substrate at regions corresponding to positions of gate lines at different pixels. The two regions have different structures. The region of the TFT substrate, which the photo spacer 1 (216) is positioned on, has a similar structure to the structure of the region shown in FIG. 7. The indented pattern surface is formed with the α-Si layer having an indented pattern as a base layer. The region, which the photo spacer 2 (218) is positioned on, has not an indented pattern surface, that is, no indented pattern layers are formed, and the region has a structure as a conventional TFT substrate usually has.

Figure 10:
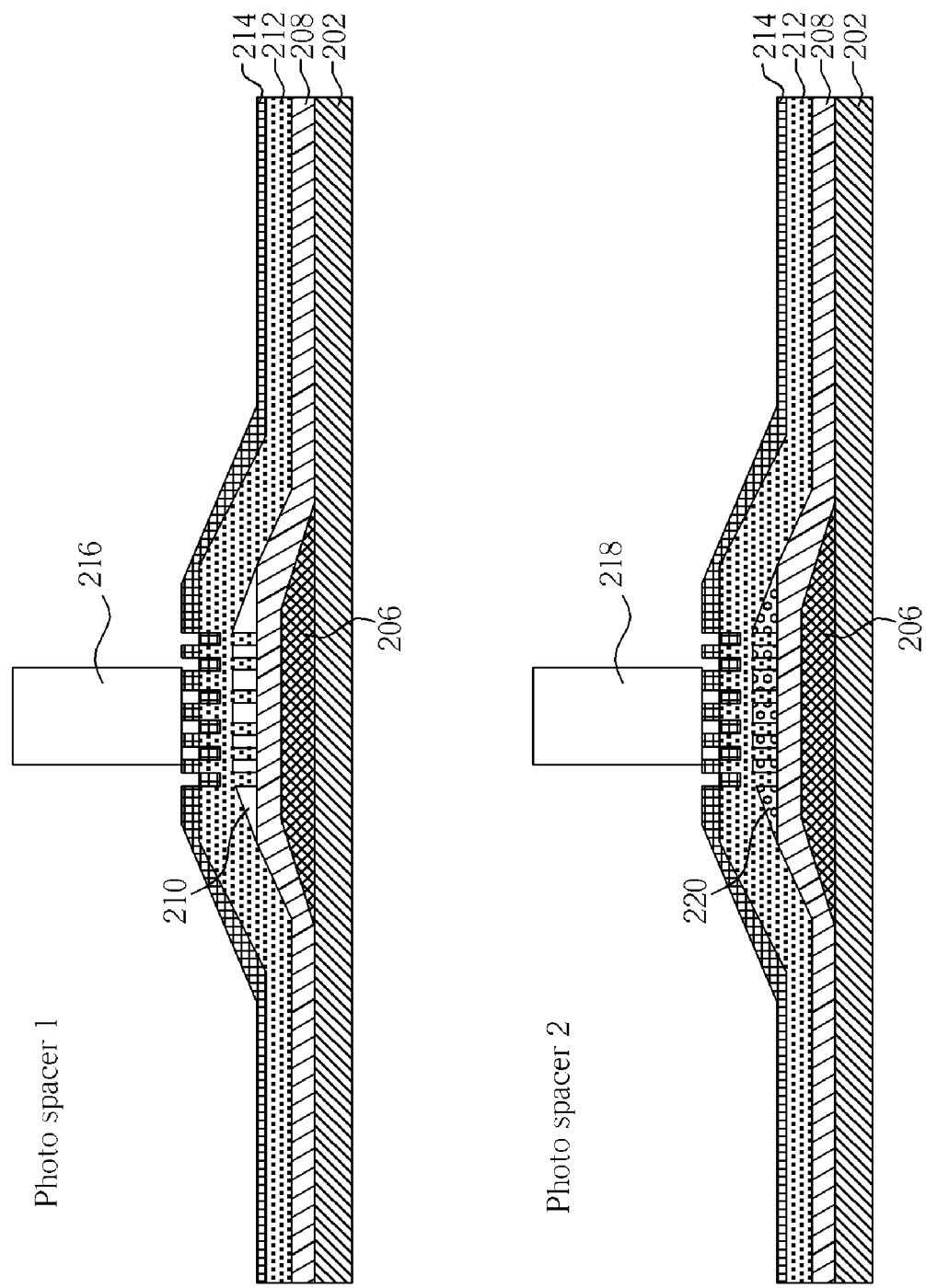

FIG. 10 shows the fifth embodiment according to the present invention. Two different types of spacers, photo spacer 1 and photo spacer 2, are positioned on a TFT substrate at regions corresponding to positions of gate lines at different pixels. The two regions have different structures. The region of the TFT substrate, which the photo spacer 1 (216) is positioned on, has a similar structure to the structure of the region shown in FIG. 6. The metal II layer 210 having an indented pattern is used as a base layer for forming the indented pattern surface on the TFT substrate. The region of the TFT substrate, which the photo spacer 2 (218) is positioned on, has a similar structure to the structure of the region shown in FIG. 7. The α-Si layer 220 having an indented pattern is used as a base layer for forming the indented pattern surface on the TFT substrate.

Figure 11:
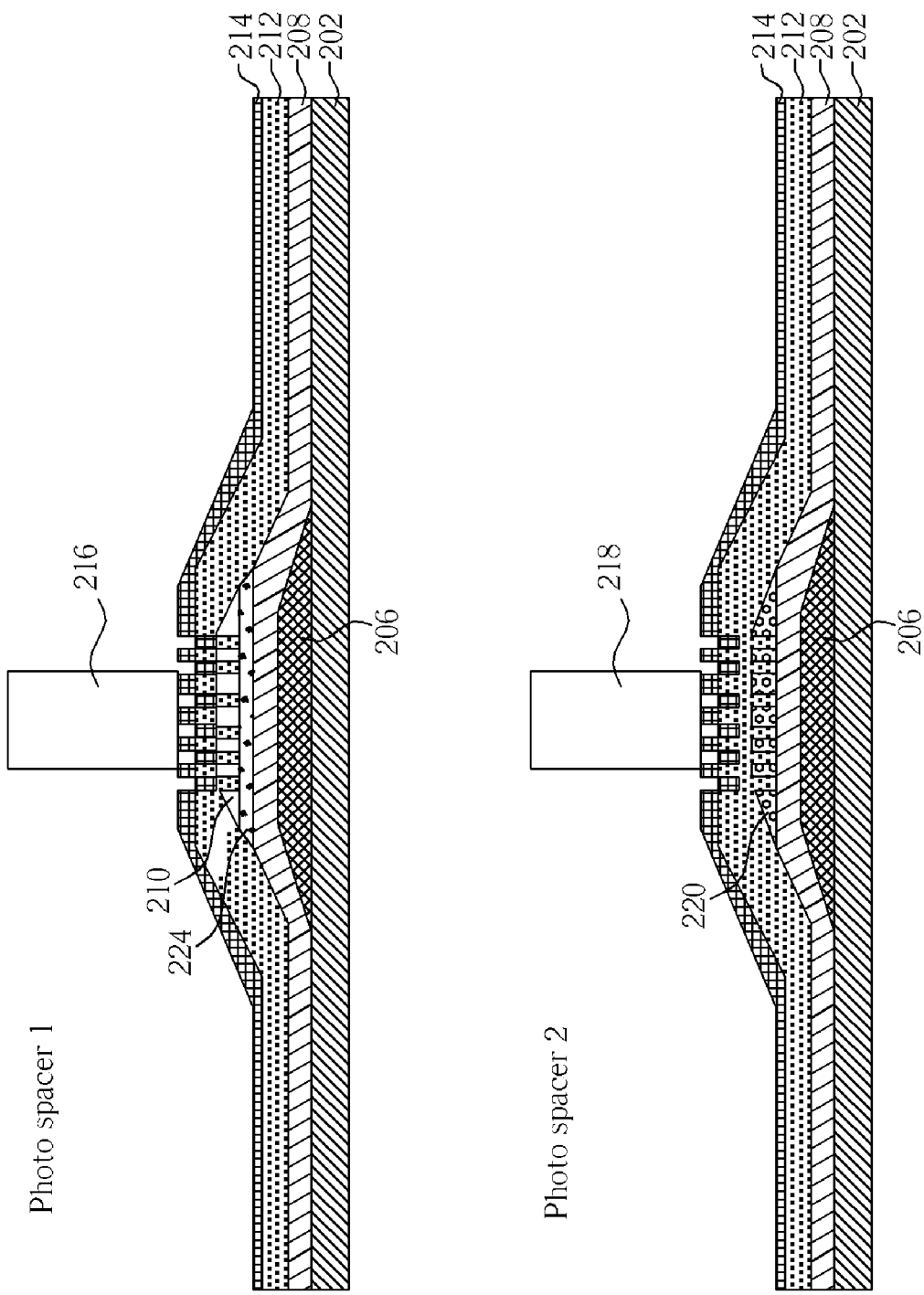

FIG. 11 shows the sixth embodiment according to the present invention. Two different types of spacers, photo spacer 1 and photo spacer 2, are positioned on a TFT substrate at regions corresponding to positions of gate lines at different pixels. The two regions have different structures. The region of the TFT substrate, which the photo spacer 1 (216) is positioned on, has a similar structure to the structure of the region as shown in FIG. 6, except that there is an α-Si layer 224 formed on the layer of the insulation layer 208 and beneath the metal II layer 210. The α-Si layer 224 and the metal II layer having an indented pattern is used as a base layer for forming the indented pattern surface on the TFT substrate. The region of the TFT substrate, which the photo spacer 2 (218) is positioned on, has a similar structure to the structure of the region shown in FIG. 7. The α-Si layer 220 having an indented pattern is used as a base layer for forming the indented pattern surface on the TFT substrate. Thus, the heights of the TFT substrate for the photo spacers 1 and 2 to reside on may be different.

Figure 12:
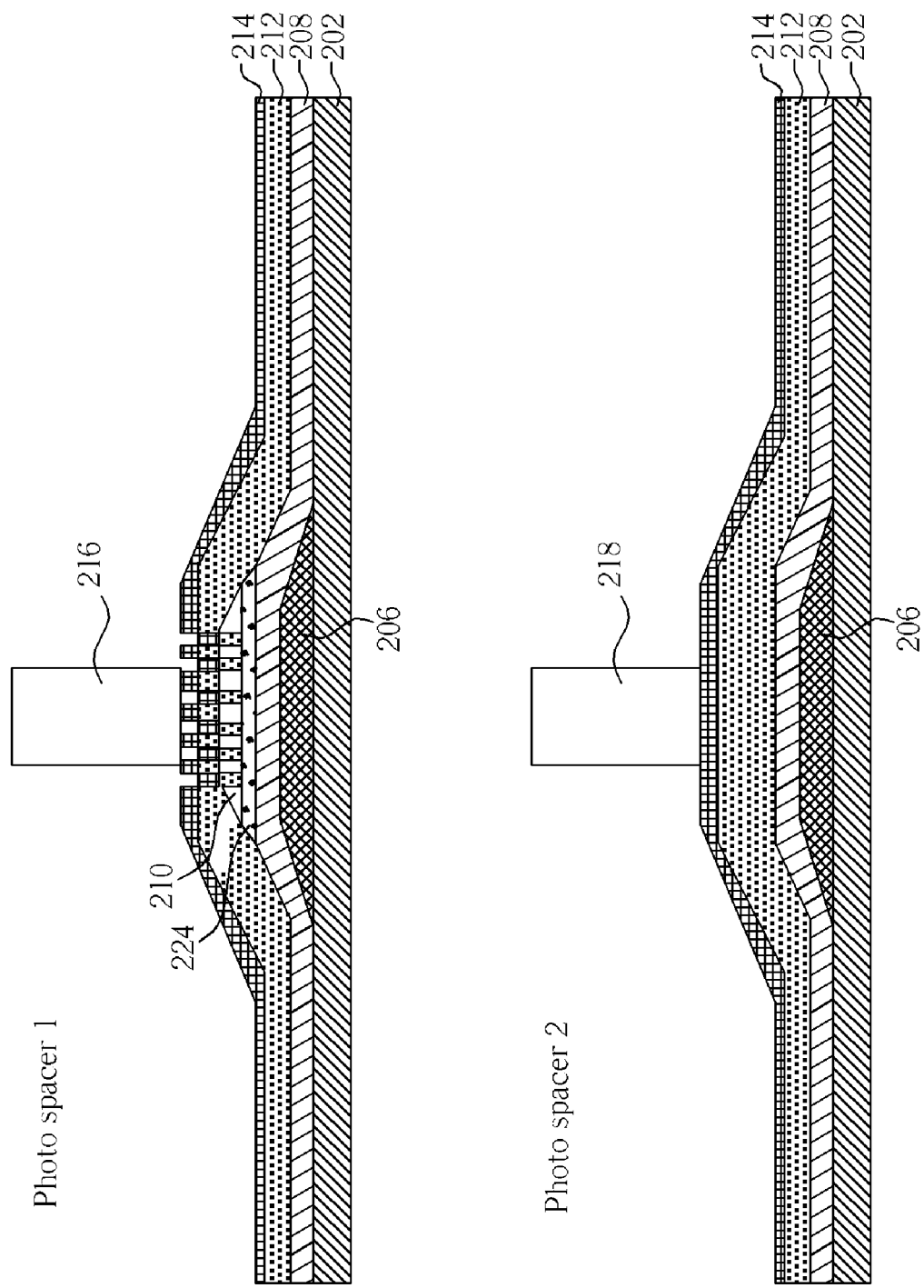

FIG. 12 shows the seventh embodiment according to the present invention. Two different types of spacers, photo spacer 1 and photo spacer 2, are positioned on a TFT substrate at regions corresponding to positions of gate lines at different pixels. Two regions have different structures. The region of the TFT substrate, which the photo spacer 1 (216) is positioned on, has a similar structure to the structure of the region as shown in FIG. 6, except that there is an α-Si layer 224 formed on the layer of the insulation layer 208 and beneath the metal II layer 210 having an indented pattern. The α-Si layer 224 and the metal II layer having an indented pattern is used as a base layer for forming the indented pattern surface on the TFT substrate. The region, which the photo spacer 2 (218) is positioned on, has not an indented pattern surface and has a structure as a conventional TFT substrate usually has. Thus, the heights of the TFT substrate for the photo spacers 1 and 2 to reside on may be different.

The indented pattern surface of the substrate is conveniently formed utilizing the material already been used to manufacture the LCD panel as a base layer.

In another aspect according to the present invention, the method of manufacturing a LCD panel comprises steps as follows.

First, a substrate is provided. A plurality of TFTs, common lines, gate lines, and source lines, and an alignment film are formed on the substrate, giving a TFT substrate. A plurality of predetermined regions of the TFT substrate are each formed to have an indented pattern surface. The indented pattern surface may be formed through forming the indented pattern directly on the alignment film at the predetermined regions, which are places the spacers will be disposed on after the LCD panel manufacturing process and usually corresponding to the position of the gate lines, data lines, or common lines, depending on the panel design.

Other than directly forming the indented pattern on the alignment film, a layer of material may be further formed on the gate lines, data lines, or common lines, at the predetermined regions, to have an indented pattern, so as to function as a base layer for forming the indented pattern surface on the TFT substrate. Then, the alignment film and layers over the layer of material are formed to have an indented pattern corresponding to the indented pattern of the layer of material. The layer of material may comprise the same material as the data lines, gate lines, common lines, thin film transistors, or dielectric materials.

In case that the layer of material comprises the same material as the data lines, gate lines, common lines, or thin film transistors, it is conveniently simultaneously formed with the data lines, gate lines, common lines, or thin film transistors. The data line, gate lines, or common lines may be made of metal or other conductive material. The thin film transistors may be made by steps including forming an α-Si layer. In case that the layer of material comprises a dielectric material other than the material used for the data line, gate lines, or common lines, an additional process may be needed, as compared to the manufacture of a conventional LCD panel, to form it.

An insulation layer for insulating the gate lines and the data lines are usually formed. Thus, the layer of material having an indented pattern may be formed on the insulation layer.

A passivation layer is usually formed over the TFTs, the gate lines, the data lines, the common lines, and the layer of material. As the layer of material has an indented pattern, the resulted passivation layer formed thereon also has an indented pattern.

The indented pattern on the base layer can be obtained by photolithography process and etching process. Then, the subsequent layers may be deposited as in a conventional manufacture, such that having an according indented pattern.

Next, another substrate is provided. An electrode over the substrate is formed. A plurality of spacers are formed on the substrate at positions corresponding to the plurality of predetermined regions of the TFT substrate. The spacers may be photo spacers.

The assembly of the two substrates may be performed by an ODF process or a vacuum injection method. In the vacuum injection method, the TFT substrate is adhered to the second substrate with a sealant for forming a cavity, and then, a liquid crystal material is filled in the cavity, forming a LCD panel. In an ODF method, the liquid crystal material is dropped on one of the substrate, and then two opposite substrates are adhered to form the LCD panel. In a result, one end of each of the spacers contacts or is surrounded by the indented pattern surface of the predetermined region of the substrate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display panel, comprising:
   a first substrate comprising thin film transistors, a plurality of gate lines, a plurality of data lines, and a plurality of common lines;
   a second substrate;
   at least one spacer positioned between the first and second substrates, wherein an end surface of the spacer entirely contacts a region of the first substrate, and the region has a surface having a first indented pattern, wherein the width of the data line, the gate line, or the common line is wider than the first indented pattern; and
   a liquid crystal material filling a space between the first and second substrates.

2. The liquid crystal display panel of claim 1, wherein the first substrate further comprises an alignment film.

3. The liquid crystal display panel of claim 2, wherein, the first substrate further comprises a passivation layer over the thin film transistors, the gate lines, and the data lines and beneath the alignment film.

4. The liquid crystal display panel of claim 2, wherein, the region is a part of the first substrate at a position corresponding to one of the gate lines and the data lines, and the region comprises a part of the alignment film having the first indented pattern.

5. The liquid crystal display panel of claim 4, wherein, the region further comprises a layer of material having a second indented pattern on the gate line, and the part of the alignment film having the first indented pattern is formed on the layer of material having the second indented pattern.

6. The liquid crystal display panel of claim 5, wherein, the layer of material having the second indented pattern comprises a material as same as the data lines or a dielectric material.

7. The liquid crystal display panel of claim 6, wherein, the first substrate further comprises an insulation layer for insulating the gate lines and the data lines, and the layer of material having the second indented pattern is on the insulation layer.

8. The liquid crystal display panel of claim 6, wherein, the first substrate further comprises a passivation layer over the thin film transistors, the gate lines, the data lines, and the layer of material, and the passivation layer has a third indented pattern corresponding to the layer of material having the second indented pattern.

9. The liquid crystal display panel of claim 4, wherein, the region further comprises a layer of material having a fourth indented pattern on the data line, and the part of the alignment film having the first indented pattern is formed on the layer of material having the fourth indented pattern.

10. The liquid crystal display panel of claim 9, wherein, the layer of material having the fourth indented pattern comprises a material as same as the gate lines or a dielectric material.

11. The liquid crystal display panel of claim 10, wherein, the first substrate further comprises an insulation layer for insulating the gate lines and the data lines, and the layer of material having the fourth indented pattern is on the insulation layer.

12. The liquid crystal display panel of claim 10, wherein, the first substrate further comprises a passivation layer over the thin film transistors, the gate lines, the data lines, and the layer of material, and the passivation layer has a fifth indented pattern corresponding to the layer of material having the fourth indented pattern.

13. The liquid crystal display panel of claim 1, wherein the second substrate further comprises a color filter.

14. The liquid crystal display panel of claim 1, wherein the region is at a position corresponding to one of the common lines and comprises a part of the alignment film having the first indented pattern.

15. The liquid crystal display panel of claim 14, wherein, the region further comprises a layer of material having a sixth indented pattern on the common line, and the part of the alignment film having the first indented pattern is formed on the layer of material having the sixth indented pattern.

16. The liquid crystal display panel of claim 15, wherein, the layer of material having the sixth indented pattern comprises the same material as the data lines, gate lines, or a dielectric material.

17. The liquid crystal display panel of claim 15, wherein, the first substrate further comprises an insulation layer for insulating the gate lines, the common lines, and the data lines, and the layer of material having the sixth indented pattern is on the insulation layer.

18. The liquid crystal display panel of claim 15, wherein, the first substrate further comprises a passivation layer over the thin film transistors, the gate lines, the data lines, and the common lines, and the passivation layer has a seventh indented pattern corresponding to the layer of material having the sixth indented pattern.

19. A method of manufacturing a liquid crystal display panel, comprising steps of:
providing a first substrate;
forming thin film transistors, common lines, gate lines, and data lines, and an alignment film on the first substrate, wherein at least one predetermined region of the first substrate is formed to have a first indented pattern, wherein the width of the data line, the gate line, or the common line is wider than the first indented pattern;
providing a second substrate;
forming an electrode over the second substrate;
forming at least one spacer on the second substrate at a position corresponding to the predetermined region of the first substrate; and
sandwiching a liquid crystal material between the first substrate and the second substrate.

20. The method of claim 19, wherein the step that the predetermined region of the first substrate is formed to have the first indented pattern surface is performed by forming the first indented pattern on the alignment film at the predetermined region.

21. The method of claim 19, wherein the step that the predetermined region of the first substrate is formed to have the first indented pattern surface is performed by further forming a layer of material having a second indented pattern on one of the gate lines, data lines, and common lines at the predetermined region, and the alignment film is formed on the layer of material, such that the alignment film has the first indented pattern corresponding to the second indented pattern.

22. The method of claim 21, wherein the layer of material is formed to comprise the same material as the data lines, gate lines, common lines, or a dielectric material.

23. The method of claim 22, further comprising a step of forming an insulation layer for insulating the gate lines and the data lines, such that the layer of material having the second indented pattern is formed on the insulation layer.

24. The method of claim 22, further comprising a step of forming a passivation layer over the thin film transistors, the gate lines, the data lines, the common lines, and the layer of material, wherein the passivation layer is formed to have a third indented pattern corresponding to the layer of material having the second indented pattern.

25. The method of claim 21, wherein the layer of material is formed during the data lines, gate lines, common lines, or thin film transistors are formed.

26. The method of claim 19, wherein the step of sandwiching a liquid crystal material between the first substrate and the second substrate comprises:
adhering the first substrate to the second substrate for forming a cavity, such that one end of each of the spacer contacts the first indented pattern of the predetermined region; and
filling the cavity with a liquid crystal material.

27. The method of claim 19, wherein the step of sandwiching a liquid crystal material between the first substrate and the second substrate comprises:
dropping a liquid crystal material on the first substrate or the second substrate; and
adhering the first substrate to the second substrate, such that one end of each of the spacer contacts the first indented pattern of the predetermined region.

* * * * *